US012645599B2

(12) United States Patent (10) Patent No.: US 12,645,599 B2
Zhang et al. (45) Date of Patent: Jun. 2, 2026

(54) METHOD AND APPARATUS FOR READING CACHE DATA, AND STORAGE MEDIUM

(71) Applicant: Glenfly Tech Co., Ltd., Shanghai (CN)

(72) Inventors: Huaisheng Zhang, Shanghai (CN); Zhongyu Tao, Shanghai (CN); Yuefan Zhang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 14 days.

(21) Appl. No.: 18/524,706

(22) Filed: Nov. 30, 2023

(65) Prior Publication Data

US 2024/0184704 A1 Jun. 6, 2024

(30) Foreign Application Priority Data

Dec. 1, 2022 (CN) .......................... 202211531116.9

(51) Int. Cl.
*G06F 12/0868* (2016.01)
*G06F 3/06* (2006.01)
(Continued)

(52) U.S. Cl.
CPC ...... *G06F 12/0868* (2013.01); *G06F 12/0873* (2013.01); *G06F 3/0659* (2013.01); *G06F 9/30145* (2013.01)

(58) Field of Classification Search
CPC ............. G06F 12/0868; G06F 12/0873; G06F 3/0659; G06F 9/30145
(Continued)

(56) References Cited

U.S. PATENT DOCUMENTS

2012/0066333 A1* 3/2012 Browning ............... G06F 13/38
709/212
2013/0232304 A1 9/2013 Lohman et al.
(Continued)

FOREIGN PATENT DOCUMENTS

CN 112639727 A 4/2021
CN 114253483 A 3/2022

OTHER PUBLICATIONS

Hao et al.; "An Energy Consumption Optimization and Evaluation for Hybrid Cache Based on Reinforcement Learning;" Journal of Computer Research and Developement; DOI: 10.7544/issn1000-1239-2020-20200010; 57(6):1125-1139; Jun. 7, 2020. (16 pgs.).

*Primary Examiner* — Arpan P. Savla
*Assistant Examiner* — Sidney Li
(74) *Attorney, Agent, or Firm* — NIXON PEABODY LLP

(57) ABSTRACT

A method and an apparatus for reading cache data, and a storage medium are provided. The method includes: receiving a read instruction; converting at least one type of address offset position corresponding to the read instruction into a coupled address offset position according to a preset rule; performing a matching operation in a data group according to the coupled address offset position which corresponds to the at least one type of address offset position and obtaining corresponding cache data; reading the cache data obtained through matching. This method is able to simultaneously perform matching operations and reading operations for at least two combined address offset positions, thereby greatly improving data reading efficiency and doubling cache data reading throughput without significantly increasing hardware logic. Furthermore, this configuration is applicable to read-only cache, read-write cache, and write-only cache, possessing great versatility.

16 Claims, 5 Drawing Sheets

(51) Int. Cl.
*G06F 9/30* (2018.01)
*G06F 12/0873* (2016.01)

(58) Field of Classification Search
USPC ......................................................... 711/118
See application file for complete search history.

(56) References Cited

U.S. PATENT DOCUMENTS

2016/0267018 A1* 9/2016 Shimizu ................ G06F 12/126
2019/0379394 A1* 12/2019 Hallak ................ G06F 16/1744
2020/0020373 A1* 1/2020 Makosiej .............. G11C 11/005

* cited by examiner

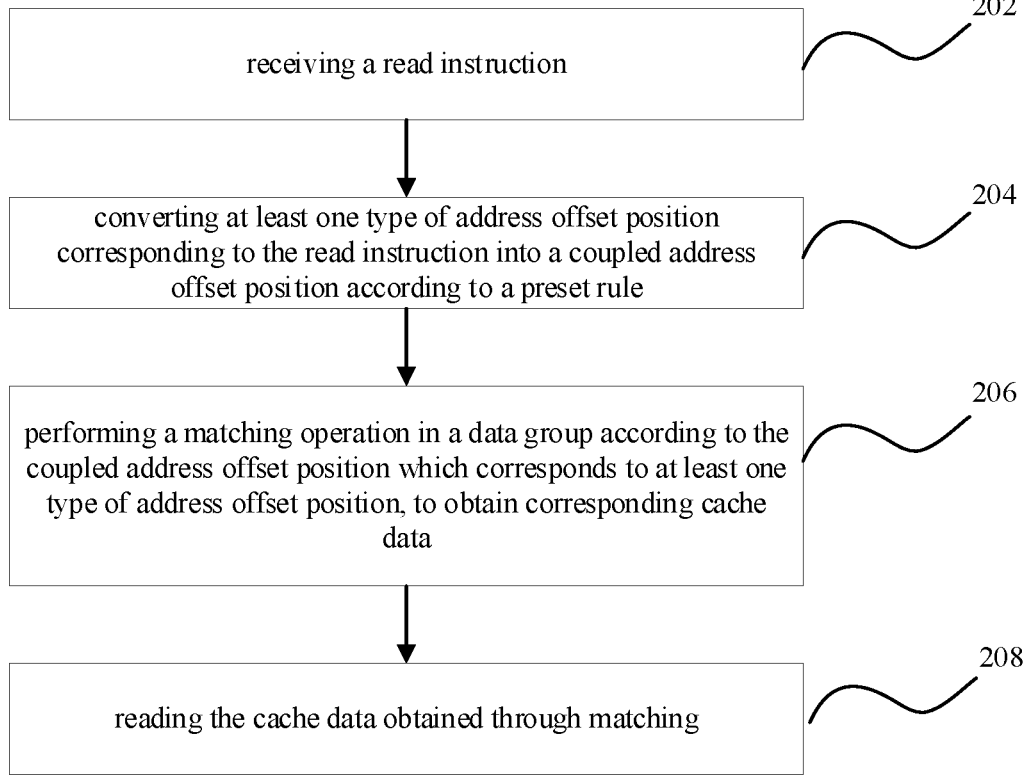

receiving a read instruction                                                      202 converting at least one type of address offset position
corresponding to the read instruction into a coupled address
offset position according to a preset rule                                        204 performing a matching operation in a data group according to the
coupled address offset position which corresponds to at least one
type of address offset position, to obtain corresponding cache
data                                                                              206 reading the cache data obtained through matching                                  208

FIG. 1

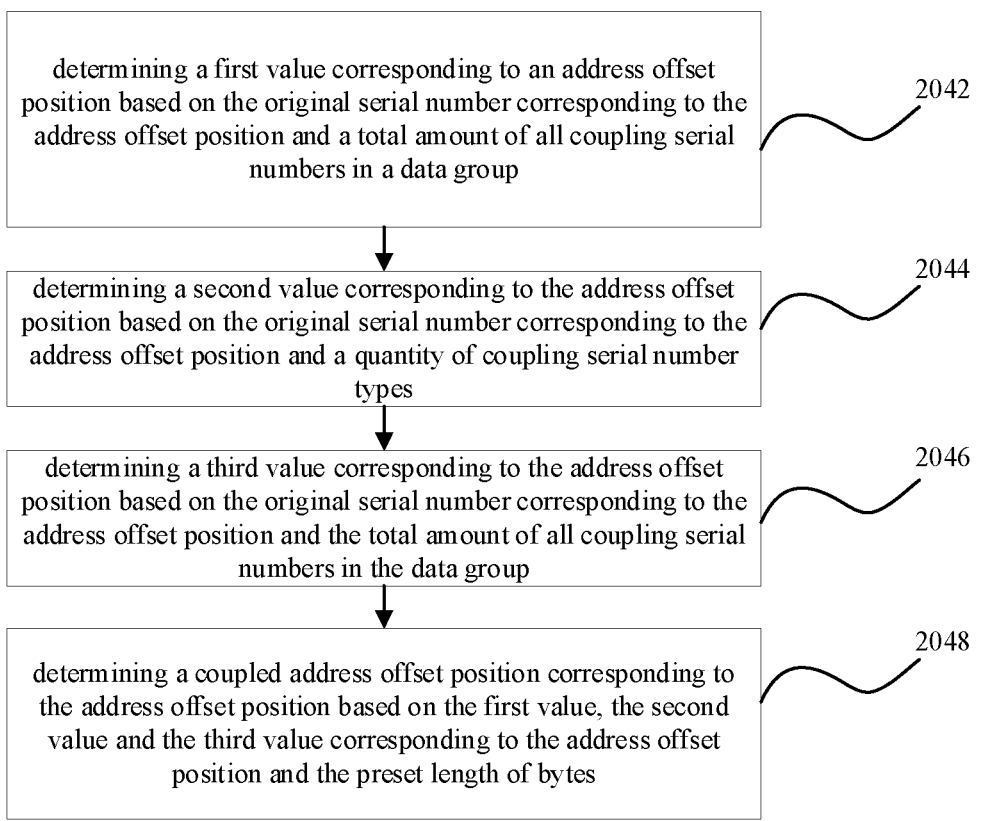

determining a first value corresponding to an address offset position based on the original serial number corresponding to the address offset position and a total amount of all coupling serial numbers in a data group ⌇ 2042 determining a second value corresponding to the address offset position based on the original serial number corresponding to the address offset position and a quantity of coupling serial number types ⌇ 2044 determining a third value corresponding to the address offset position based on the original serial number corresponding to the address offset position and the total amount of all coupling serial numbers in the data group ⌇ 2046 determining a coupled address offset position corresponding to the address offset position based on the first value, the second value and the third value corresponding to the address offset position and the preset length of bytes ⌇ 2048

FIG. 5

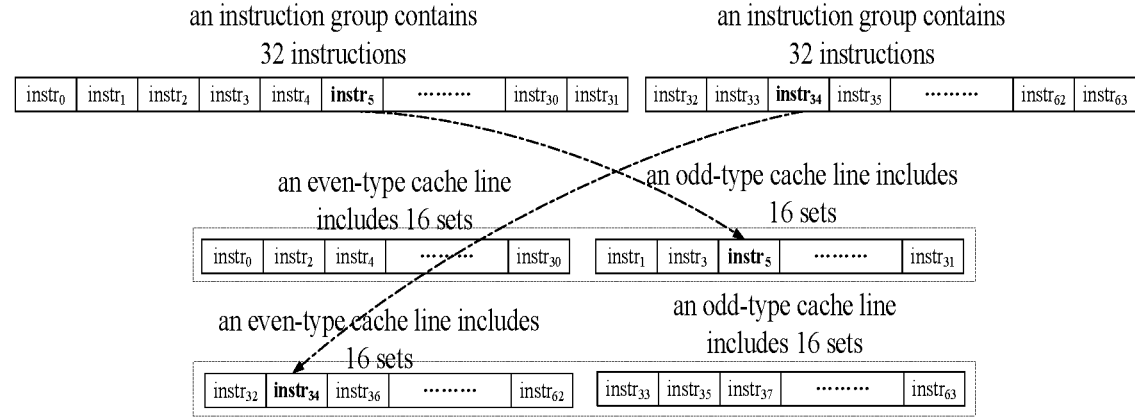

702 receiving module

704 conversion module

706 matching module

708 reading module apparatus for reading cache data

704

7042 first determination unit

7044 second determination unit

7046 third determination unit

7048 fourth determination unit conversion module

METHOD AND APPARATUS FOR READING CACHE DATA, AND STORAGE MEDIUM

CROSS REFERENCE TO RELATED APPLICATION

This application claims priority under 35 U.S.C. § 119 to Chinese Patent Application No. 202211531116.9, filed on Dec. 1, 2022, the entire content of which is incorporated herein in its entirety.

TECHNICAL FIELD

The present application relates to the technical field of data processing, and more particularly, relates to a method for reading cache data, an apparatus for reading cache data, a storage medium and a computer program product.

BACKGROUND

The traditional high-speed cache can only process one match detection read one instruction per clock cycle. In a situation where the number of computing units and the number of threads are doubled, it may be necessary to process multiple instructions per clock cycle in order to satisfy the requirements of additional threads. In a conventional treatment, multiple caches are designed to meet the requirements; however, such design causes a large amount of hardware logic, which may greatly increase cost of the device in actual implementation.

The instruction cache may encounter similar problem. If it is required to read multiple instructions for multiple threads per clock cycle, a simple strategy is to directly use multiple instruction caches, which greatly increases hardware logic. Hence, hardware overhead is increased and cost-effectiveness is low.

SUMMARY

In view of the above-mentioned technical problems, a method and an apparatus for reading cache data, a storage medium and a computer program product are provided, which may save hardware consumption while improving reading efficiency.

In a first aspect, a method for reading cache data is provided by the present disclosure, which includes the following:

receiving a read instruction;

converting, according to a preset rule, at least one type of address offset position corresponding to the read instruction into a coupled address offset position;

performing a matching operation in a data group according to the coupled address offset position which corresponds to the at least one type of address offset position, to obtain corresponding cache data; and reading the cache data obtained through matching.

In accordance with an embodiment, each data group stores at least one cache data type, and each cache data type is composed of multiple sets of cache data, each set occupying a preset length of bytes; each data group includes at least one coupling serial number type, and each coupling serial number type is composed of a preset quantity of coupling serial numbers; the at least one cache data type has a one-to-one correspondence with the at least one coupling serial number type, and respective sets of cache data have a one-to-one correspondence with coupling serial numbers of a corresponding coupling serial number type;

the converting, according to the preset rule, the at least one type of address offset position corresponding to the read instruction into the coupled address offset position includes:

determining a first value corresponding to an address offset position based on an original serial number corresponding to the address offset position and a total amount of all coupling serial numbers in the data group;

determining a second value corresponding to the address offset position based on the original serial number corresponding to the address offset position and a quantity of coupling serial number types;

determining a third value corresponding to the address offset position based on the original serial number corresponding to the address offset position and the total amount of all coupling serial numbers in the data group; and determining a coupled address offset position corresponding to the address offset position based on the first value, the second value and the third value corresponding to the address offset position and the preset length of bytes.

In accordance with an embodiment, the determining the first value corresponding to the address offset position based on the original serial number corresponding to the address offset position and the total amount of all coupling serial numbers in the data group includes:

dividing the original serial number corresponding to the address offset position by the total amount of all coupling serial numbers in the data group and rounding down a result of division;

multiplying an integer obtained through the rounding down operation by the total amount of coupling serial numbers of all coupling serial number types as the first value.

In accordance with an embodiment, the determining the second value corresponding to the address offset position based on the original serial number corresponding to the address offset position and the quantity of coupling serial number types includes:

dividing the original serial number corresponding to the address offset position by the quantity of coupling serial number types and taking a remainder after division; and multiplying the remainder by the preset quantity of coupling serial numbers to obtain the second value.

In accordance with an embodiment, the determining the third value corresponding to the address offset position based on the original serial number corresponding to the address offset position and the total amount of all coupling serial numbers in the data group includes:

dividing the original serial number by the total amount of all coupling serial numbers in the data group and taking a remainder after division; and performing right shifting on the remainder after division according to a second preset value to obtain the third value corresponding to the address offset position.

In accordance with an embodiment, the performing the matching operation in the data group according to the coupled address offset position which corresponds to the at least one type of address offset position, to obtain the corresponding cache data further includes:

retrieving corresponding storage data from a memory according to the read instruction in a case that there is no corresponding cache data in the data group;

storing the storage data in a new data group to form new cache data.

In a second aspect, an apparatus for reading cache data is further provided by the present disclosure, which includes:

a receiving module, which is configured to receive a read instruction;

a conversion module, which is configured to convert at least one type of address offset position corresponding to the read instruction into a coupled address offset position according to a preset rule;

a matching module, which is configured to perform a matching operation in a data group according to the coupled address offset position which corresponds to the at least one type of address offset position and obtain corresponding cache data; and a reading module, which is configured to read the cache data obtained through matching.

In a third aspect, a computer readable storage medium is further provided by the present disclosure. The computer readable storage medium stores a computer program thereon. Steps of the method for reading cache data according to any one of the above-mentioned embodiments are implemented when the computer program is executed by a processor.

In a fourth aspect, a computer program product is further provided by the present disclosure. The computer program product includes a computer program, and steps of the method for reading cache data according to any one of the above-mentioned embodiments are implemented when the computer program is executed by a processor.

With above-mentioned method and apparatus for reading cache data, storage medium and computer program product, it is able to receive read instruction for multiple address offset positions, to convert the multiple address offset positions into coupled address offset positions according to a preset rule, and to simultaneously perform matching operations and reading operations on multiple coupled address offset positions, thereby greatly improving data reading efficiency and doubling the cache data reading throughput without significantly increasing hardware logic. Furthermore, this configuration may be applied to read-only cache, read-write cache and write-only cache, which possesses great versatility.

BRIEF DESCRIPTION OF THE DRAWINGS

FIG. 1 is a schematic flow chart of a method for reading cache data according to an embodiment;

FIG. 5 is a schematic flow chart of a method for reading cache data according to an embodiment;

FIG. 6 is a schematic diagram of data groups, which store cache data, in a Coupled Instruction Cache according to an embodiment;

DETAILED DESCRIPTION OF THE EMBODIMENTS

Figure 2:
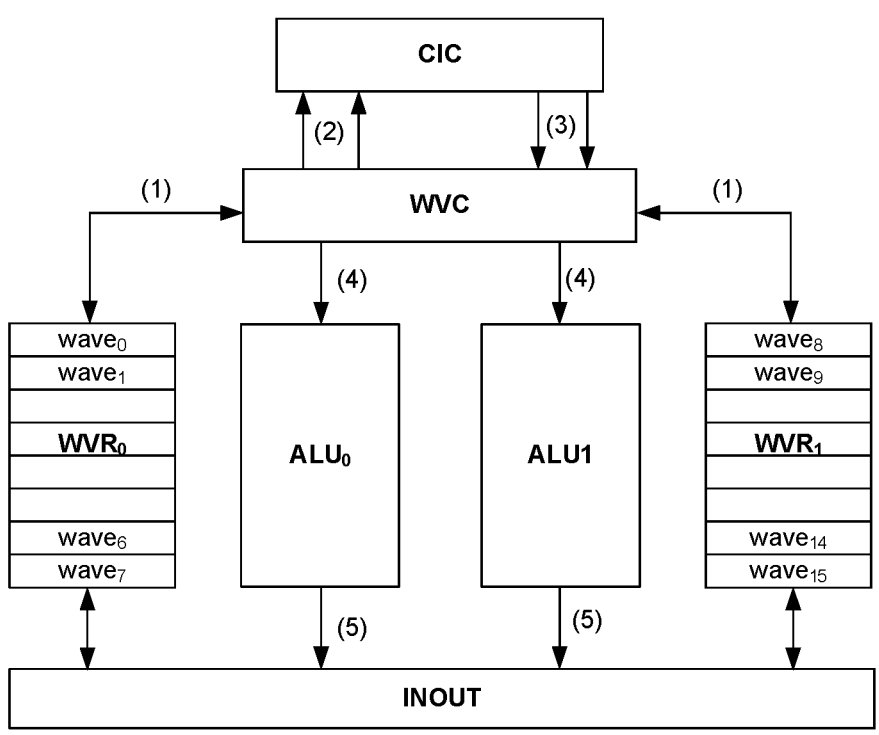
FIG. 2 is a structural block diagram when an execution unit adopts a Coupled Instruction Cache according to an embodiment.

The present disclosure is described in further detail below according to embodiments in conjunction with the accompanying drawings, to clarify objectives, technical solutions and advantages of the present disclosure. It should be understood that particular embodiments described herein are intended only to explain the present disclosure rather than to limit the present disclosure.

According to an embodiment, a method for reading cache data is provided. It is exemplarily explained based on a case of applying the method for reading cache data to a processor in the embodiment. It may be understood that the processor may be located on a terminal or a server. As shown in FIG. 1, the method for reading cache data includes the following steps.

Step 202 includes receiving a read instruction.

The read instruction is an instruction of acquiring cache data, that is sent to a processor.

The read instruction may be sent by a user through a human-computer interaction interface on a terminal, or may be automatically sent according to a preset timedly-triggered task, or may be automatically sent at a preset trigger frequency.

As an example, a modern graphics processing unit (GPU) includes a large number of execution units that are used to perform dynamic computations of various shading programs, so parallel computing can be accelerated by taking advantage of the feature of multi-thread multi-execution unit of the GPU. A thread in the GPU is called a wave, which contains multiple sub-units (lanes). The GPU may packetize all lanes to perform read, and may perform writing and computing operations in a Single Instruction Multiple Data (SIMD) manner. Usually, the GPU packetizes 32 or 64 lanes into a GPU wave, which is called a simd32 wave or a simd64 wave.

Furthermore, an execution unit in GPU consists of components such as a wave register unit (WVR), a wave controller (WVC), an arithmetic logic unit (ALU), an instruction cache (IC), and an input-output (INOUT). The WVR is used to temporarily store intermediate data of waves. WVC is a control unit that manages and schedules each wave, which may perform steps including: wave selecting, instruction fetching, decoding, transmitting, and the like. The WVC may select one suitable wave from 8 waves, which are temporarily stored in the WVR, according to priorities within each preset clock cycle; send a read instruction request of the selected wave to the IC; decode returned cache data; and transmit a processing instruction to the ALU to enable the ALU to execute computing of the wave. The ALU is configured to complete a function of computing of the wave, which is able to simultaneously process computing of multiple lanes in the SIMD manner, including arithmetic operations, logical operations, bit operations, jump determination, special functions, etc., and to write computing results into the WVR or output the computing results through the INOUT. The IC is configured to read cache data for a wave corresponding to the read instruction request according to the read instruction request sent by the WVC. The IC is a high-speed cache that includes a cache space, a matching control logic, a tag unit, etc. The cache space is organized in the form of multiple cache lines for purpose of management.

The read instruction in the embodiment may refer to: the WVC selects a wave according to a preset priority order and sends a read instruction request to the IC, the read instruction request being configured to read, from the IC, cache data corresponding to the wave selected by the WVC.

Step 204 includes converting, according to a preset rule, at least one type of address offset position corresponding to the read instruction into a coupled address offset position.

The address offset position refers to a position where data corresponding to the read instruction is located in a normal instruction cache.

As an example, a coupled address offset position refers to a position where data corresponding to the read instruction is located in a coupled instruction cache. The coupled instruction cache can separately store at least two types of cache data. According to the embodiment, the read instruction may be used to simultaneously read cache data for at least two waves. For example, the coupled address offset position may indicate a position in an odd cache line and a position in an even cache line.

The address offset position refers to a position where corresponding data is located in a normal instruction cache, such position being contained in a read instruction.

After the shader program in the GPU is called by a compiler, a set of instructions that can be executed directly on the GPU, called the shader instruction program, are obtained. Each shader instruction program consists of multiple instructions, with each instruction corresponding to one wave.

As an example, if each instruction occupies n bytes and the shader instruction program has m instructions in total, then the shader instruction program currently occupies (m*n) bytes.

The normal instruction cache (IC) stores cache data in the form of multiple sequentially arranged cache lines, and all the cache lines in the IC form multiple data groups. Each time, only one matching detection may be performed for the read instruction of one wave and only one instruction may be read. The IC may calculate a corresponding address offset position (i*n) based on an i-th instruction corresponding to the read instruction, and may directly obtain corresponding cache data.

In order to significantly enhance the computing power and improve the data throughput, in a case that a read instruction is used for simultaneous reading of cache data of k waves, the execution unit according to the embodiment may use a coupled instruction cache instead of the IC. The cache data is divided into k types and stored separately by the coupled instruction cache, and the cache data is mapped to data groups of the coupled instruction cache. Each data group of the coupled instruction cache includes k types of cache lines, and each cache line stores pieces of cache data whose coupling serial numbers have an interval of k. The coupled instruction cache may use k types of matching detection mechanisms to perform matching detection operations and reading operations respectively on cache lines, located at k locations, corresponding to the read instruction. In addition, according to the embodiment, k ALUs are respectively used to perform calculations on the cache data in the k types of cache lines, and k WVRs are respectively used to temporarily store the cache data in the k types of cache lines. Other components remain unchanged.

Here, k is greater than or equal to 2.

According to an embodiment, as shown in FIG. 2, in a case that a read instruction is used to read cache data for two waves simultaneously, an execution unit in the embodiment may use a Coupled Instruction Cache (CIC) instead of the IC. The cache data is stored in the CIC in an odd-even alternating manner, and is mapped to separate data groups of the CIC. Each data group of the CIC includes an odd-type cache line and an even-type cache line. The CIC may use two matching detection mechanisms to respectively perform matching detection operations and reading operations on an odd-type cache line and an even-type cache line corresponding to the read instruction. In addition, according to the embodiment, two ALUs ($ALU_0$ and $ALU_1$) are used to perform calculations on the cache data in the odd-type cache line and the cache data in the even-type cache line respectively, and two WVRs ($WVR_0$ and $WVR_1$) are respectively used to temporarily store the cache data in the odd-type cache line and the cache data in the even-type cache line, while other components remain unchanged. With the CIC in the embodiment, data in the odd-type cache line and data in the even-type cache line may be detected and read simultaneously in response to each read instruction; in addition, the CIC is hardware-friendly with relatively low hardware logic overhead.

Figure 3:
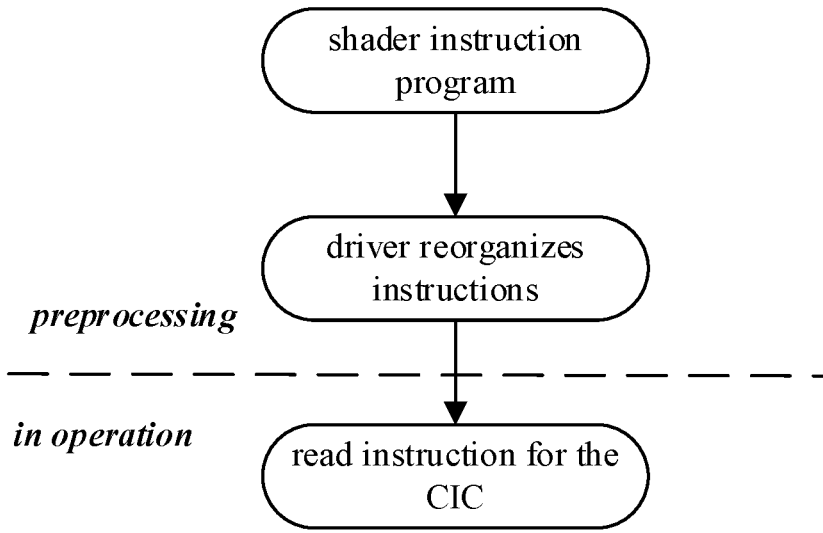
FIG. 3 is a schematic flow chart of processing a shader instruction program when the execution unit adopts a Coupled Instruction Cache according to an embodiment.

Therefore, as shown in FIG. 3, for a CIC, a driver needs to reorganize the shading instruction program in advance into odd and even instructions which are alternated, and stores reorganized instructions into a memory space. During runtime, the CIC further calculates to obtain a coupled address offset position and reads corresponding cache data based on the obtained coupled address offset position.

Specifically, the address offset position refers to a position where data is located in a specific cache line in the IC, and coupled address offset positions refer to a position where data is located in a specific odd-type cache line in the CIC and a position where data is located in a specific even-type cache line in the CIC.

In the embodiment, a processor uses a CIC and, upon receiving a read instruction, converts positions of data in cache lines in the normal instruction cache which are originally carried by the read instruction into positions of data in an odd-type cache line and an even-type cache line of the CIC.

Step 206 includes performing a matching operation in a data group according to the coupled address offset position which corresponds to at least one type of address offset position, and obtaining corresponding cache data.

In a case that a read instruction is used to simultaneously read cache data for k waves, a CIC is adopted to store cache data in the embodiment. The CIC includes k types of cache lines. Each cache line stores sets of cache data whose coupling serial numbers have an interval of k. Coupled address offset positions corresponding to address offset positions refer to k positions in k types of cache lines.

As an example, in a case that a read instruction is used to simultaneously read cache data for two waves, the CIC is adopted to store cache data in the embodiment. In the CIC, the cache data is stored in odd-type cache lines and even-type cache lines which are alternating. Coupled address offset positions corresponding to address offset positions refer to a position in an odd-type cache line and a position in an even-type cache line in the CIC.

Figure 4:
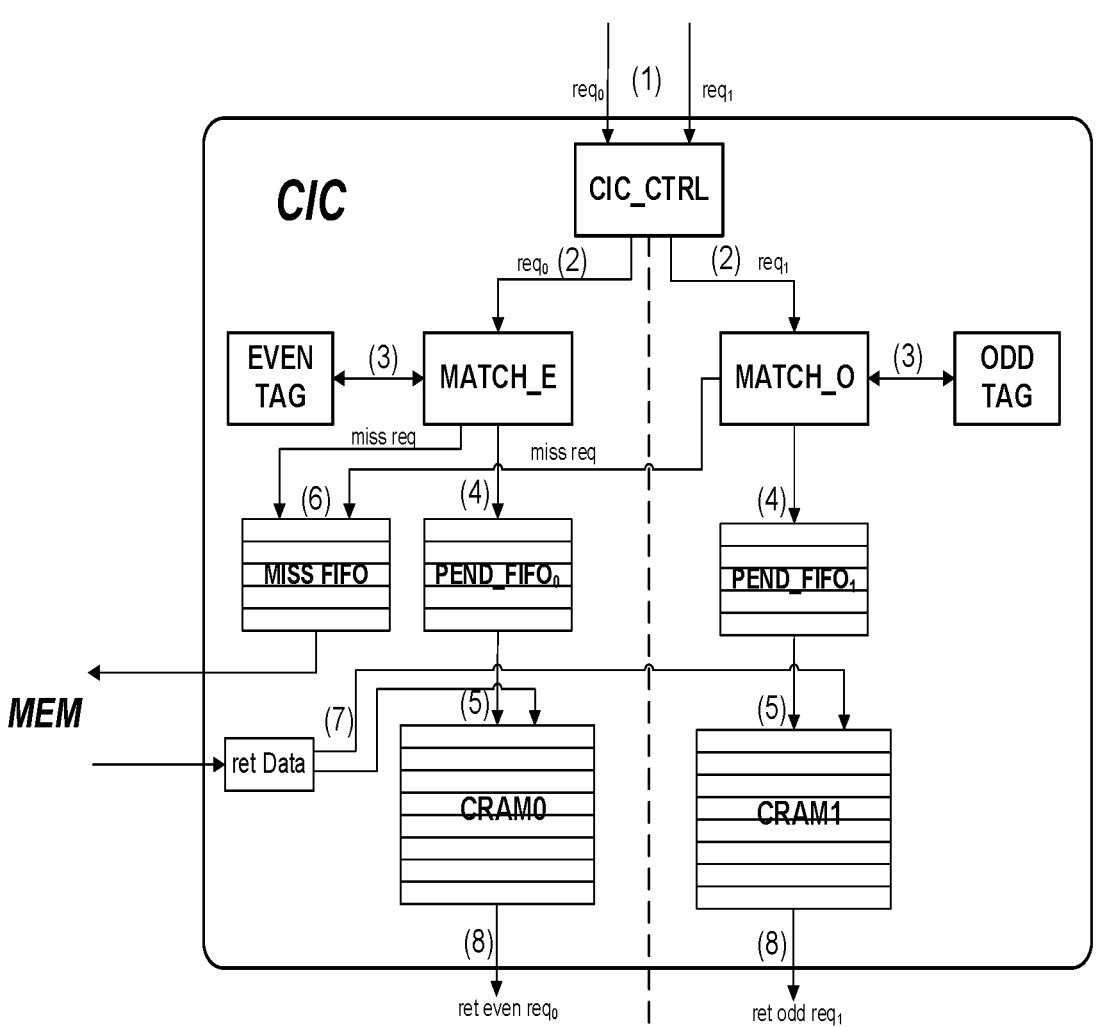
FIG. 4 is a structural block diagram of main logic components in a Coupled Instruction Cache according to an embodiment.

As an example, compared to the instruction cache (IC), the CIC in the embodiment mainly uses two sets of matching control logic, and the cache space is partitioned into odd and even blocks to handle read requests for two waves simultaneously. For example, as shown in FIG. 4, the CIC includes main logic components as follows: CIC_CTRL, EVEN TAG, ODD TAG, MATCH_E, MATCH_O, PEND_FIFO$_0$, PEND_FIFO$_1$, MISS_FIFO, CRAM0 and CRAM1. The CIC_CTRL refers to a control unit that is adapted to receive a read instruction request from a Wave Controller, convert address offset positions which correspond to a read instruction into coupled address offset positions, and send read requests to both matching control logics on the left and on the right. The EVEN TAG and the ODD TAG are adapted to record tag information of all cache lines. Tag of each cache line includes information such as a virtual address, a priority, a status. The tag information is utilized in request of matching detection operation. The EVEN TAG and the ODD TAG respectively record tag information of cache lines with even cache line addresses and tag information of cache lines with odd cache line addresses. The MATCH_E and the MATCH_O refer to matching control logics of the CIC, which respectively correspond to the EVEN TAG and the ODD TAG. The MATCH_E and the MATCH_O are adapted to read tag information of cache lines from corresponding TAG units based on read requests respectively received by the MATCH_E and the MATCH_O, perform address matching detections, update the TAG units, use the commonly used Pseudo Least Recently Used (PLRU) strategy to update matching binary trees, and output matching results to subsequent units. The PEND_FIFO$_0$ and the PEND_FIFO$_1$ refer to two caches that temporarily store matching results, which read data from and write data into the CRAM0 and the CRAM1 respectively in a First In First Out order. The CRAM0 and the CRAM1 refer to two blocks of instruction cache space that are used to record cache data in even-type cache lines and odd-type cache lines respectively. Each block of space is organized into a storage structure having multiple cache lines, and each cache line records data of a fixed-size (e.g., 2 kbits), and tag information of respective cache lines is recorded in the TAG units.

Specifically, in Step 206, a processing logic of the CIC is as follows. (1) The control unit CIC_CTRL in the CIC receives a read instruction for two waves sent by the WVC, where the read instruction includes req0 for even-type cache lines and req1 for odd-type cache lines. (2) The CIC_CTRL converts address offset positions corresponding to req0 and req1 into coupled address offset positions and sends the coupled address offset positions of req0 and req1 to both matching control logics on the left and on the right respectively. (3) The MATCH_E and the MATCH_O in the CIC read corresponding cache line tag information from the EVEN TAG and the ODD TAG, and perform address matching detection operations on the coupled address offset positions of req0 and req1 respectively, where the MATCH_E is responsible for matching detection of the coupled address offset position of req0, and the MATCH_O is responsible for matching detection of the coupled address offset position of req1. (4) Matching detection results of the MATCH_E and the MATCH_O are output to two PEND_FIFOs respectively, and matching results are obtained from the two PEND_FIFOs according to a First In First Out order.

According to the embodiment, the processor performs matching among even-type cache lines and odd-type cache lines of the CIC of the embodiment to obtain positions of corresponding cache data based on the coupled address offset positions corresponding to the address offset positions, and determines the corresponding cache data.

Step 208 includes reading the cache data obtained through matching.

As an example, in Step 208, the processor first obtains matching results from the PEND_FIFOs in a First In First Out order, then reads data from and writes data into corresponding cache lines in the CRAM0 and the CRAM1. Each CRAM needs to process one read instruction request to obtain corresponding cache data. Then, the CIC returns the cache data to the WVC, making it convenient for the WVC to further process the two waves.

As shown in FIG. 4, the processing logic of the CIC also includes: (5) obtaining matching results from the PEND_FIFOs in a First In First Out order, and reads data from and writes data into corresponding cache lines in the CRAM0 and the CRAM1, where each CRAM needs to process one read instruction request.

According to the embodiment, the processor reads the cache data, which is obtained through matching, from the even-type cache line and the odd-type cache line of the CIC, thereby completing reading the cache data.

In the above-mentioned method for reading cache data, the processor is able to receive a read instruction for at least two waves, where the read instruction carries address offset positions that correspond to at least two waves and applicable to normal ICs; the processor converts at least two address offset positions into coupled address offset positions according to a preset rule, performs matching among cache lines of a coupled instruction cache based on the converted coupled address offset positions to obtain corresponding cache data, and reads the corresponding cache data. With the above-mentioned method for reading cache data, read instructions for cache data of at least two waves may be received simultaneously, and matching and reading operations for at least two positions may be performed simultaneously, thereby greatly improving data reading efficiency and doubling a cache data reading throughput without significantly increasing hardware logic. Furthermore, this configuration may be applied to a read-only cache, a read-write cache, and a write-only cache, which possesses great versatility.

According to the following embodiments, the execution unit adopts the CIC instead of the IC, and the CIC stores cache data in an odd-even alternating manner. Each data group of the CIC includes an even-type cache line and an odd-type cache line. Processes of using the read instruction to simultaneously read cache data for two or more waves and equipping the execution unit with the CIC are not repeated herein.

As shown in FIG. 5, according to some possible embodiments, each data group stores at least one cache data type, and each cache data type is composed of multiple sets of cache data, each set occupying a preset length of bytes. Each data group contains at least one coupling serial number type, and each coupling serial number type is composed of a preset quantity of coupling serial numbers. The at least one cache data type has a one-to-one correspondence with the at least one coupling serial number type, and respective sets of cache data have a one-to-one correspondence with coupling serial numbers of a corresponding coupling serial number type. Step 204 includes Steps 2042 to 2048. Step 2042 includes: determining a first value corresponding to an address offset position based on an original serial number corresponding to the address offset position and a total amount of all coupling serial numbers in the data group. Step 2044 includes: determining a second value corresponding to the address offset position based on the original serial number corresponding to the address offset position and a quantity of coupling serial number types. Step 2046 includes: determining a third value corresponding to the address offset position based on the original serial number corresponding to the address offset position and the total amount of all coupling serial numbers in the data group. Step 2048 includes: determining a coupled address offset position corresponding to the address offset position based on the first value, the second value and the third value corresponding to the address offset position and the preset length of bytes.

Specifically, the original serial number corresponding to the address offset position refers to a serial number of a set of cache data in the IC. Specifically, in the IC, all cache data is divided into multiple sets according to a preset size, and these sets are arranged in sequence and assigned ascending values as serials numbers of the sets.

Each data group contains at least one cache data type, and each cache data type includes multiple sets of cache data. Each cache data type corresponds to one coupling serial number type. Each set of cache data in each cache data type corresponds to one coupling serial number in one coupling serial number type.

As an example, according to the embodiment, a size of each data group in the IC is 256 bytes and a size of each data group in the CIC is 256 bytes; a size of each set in the IC is 8 bytes and a size of each set of cache data of each cache data type in the CIC is 8 bytes. Hence, each group in the IC may store 32 sets of cache data, and a first group, for example, may be marked as {instr0, instr1, instr2, . . . , instr31}. Correspondingly, one cache data type of the CIC stores 16 sets of cache data, and another cache data type stores 16 sets of cache data, where the 16 sets of cache data of the former cache data type are marked, for example, as {instr0, instr2, instr4, . . . , instr30}, and the 16 sets of cache data of the latter cache data type are marked, for example, as {instr1, instr3, instr5, . . . , instr31}.

Furthermore, Step 204 may determine the coupled address offset position in the CIC corresponding to the address offset position with the following formula:

$$\delta = n*\{L_1 + L_2 + L_3\}$$

$\delta$ represents the coupled address offset position, where n represents the preset length of bytes, $L_1$ represents the first value, $L_2$ represents the second value, and $L_3$ represents the third value.

According to the present embodiment, the processor determines the coupled address offset position corresponding to the address offset position based on the serial number of the set of cache data in the IC, the total amount of coupling serial numbers of the two coupling serial number types contained in each data group in the CIC, the preset quantity, and the preset length of bytes of each set of cache data in each of the two cache data types.

According to some possible embodiments, determining the first value corresponding to the address offset position based on the original serial number corresponding to the address offset position and the total amount of all coupling serial numbers in the data group includes: dividing the original serial number corresponding to the address offset position by the total amount of all coupling serial numbers in the data group, rounding down the result of division, and multiplying an integer obtained through the rounding down operation by the total amount of coupling serial numbers of all coupling serial number types as the first value.

According to the embodiment, the processor calculates the first value via the following formula:

$$L_1 = \left\lfloor \frac{j}{2p} \right\rfloor * 2p$$

$L_1$ represents the first value;

$$\left\lfloor \frac{j}{2p} \right\rfloor$$

represents dividing and rounding down; j represents the original serial number corresponding to the address offset position; p represents the preset quantity and the quantity of coupling serial number types is 2.

According to the embodiment, the processor divides the original serial number corresponding to the address offset position by the total amount of coupling serial numbers of all coupling serial number types, rounds down the result of division, and multiplies an integer obtained through the rounding down operation by the total amount of coupling serial numbers of all coupling serial number types to obtain the first value.

According to some possible embodiments, determining the second value corresponding to the address offset position based on the original serial number corresponding to the address offset position and the quantity of coupling serial number types includes: dividing the original serial number corresponding to the address offset position by the quantity of coupling serial number types and taking a remainder after division; multiplying the remainder by the preset quantity of coupling serial numbers to obtain the second value.

Furthermore, in the embodiment, the processor calculates the second value via the following formula:

$$L_2 = (j\%2)*p$$

$L_2$ represents the second value; (j%2), which means dividing j by 2 and taking the remainder after division, returns 1 in a case that j is odd and returns 0 in a case that j is even.

According to some possible embodiments, determining the third value corresponding to the address offset position based on the original serial number corresponding to the address offset position and the total amount of all coupling serial numbers in the data group includes: dividing the original serial number by the total amount of all coupling serial numbers in the data group and taking a remainder after division; then performing right shifting on the remainder after division to obtain the third value corresponding to the address offset position.

Furthermore, according to the embodiment, the processor calculates the third value via the following formula:

$$L_3 = [(j\%(2p)) >> 1]$$

$L_3$ represents the third value; j%(2p) represents taking the remainder after diving j by 2p; >> represents right shifting.

Specifically, a binary value is used in the above-mentioned formula for calculating the third value.

According to the embodiment, the processor divides the original serial number corresponding to the address offset position by the total amount of first-type coupling serial numbers and second-type coupling serial numbers in the data group, shifts a binary number of the remainder after division one bit to the right to obtain the third value.

According to some possible embodiments, determining the coupled address offset position corresponding to the address offset position based on the first value, the second value and the third value corresponding to the address offset position and the preset length of bytes includes: calculating the coupled address offset position via the following formula:

$$\delta = n * \left\{ \left\lfloor \frac{j}{tp} \right\rfloor * tp + (j\%t) * p + [(j\%(tp)) \gg u] \right\}$$

Here, $\delta$ represents the coupled address offset position; n represents the preset length of bytes; j represents the original serial number; p represents the preset quantity;

$$\left\lfloor \frac{j}{tp} \right\rfloor * tp$$

represents the first value, where $$\left\lfloor \frac{j}{tp} \right\rfloor$$

represents dividing the original serial number by the total amount of all coupling serial numbers in the data group and rounding down the result of division; $(j\%t)*p$ represents the second value, where $(j\%t)$ represents dividing the original serial number corresponding to the address offset position by the quantity t of coupling serial number types and taking a remainder after division, where the value of $(j\%t)$ ranges from 0 to $t-1$; $[(j\%(tp))\gg u]$ represents the third value, where $j\%(tp)$ represents dividing the original serial number by the total amount of all coupling serial numbers in the data group and taking the remainder after division, and $\gg$ represents right shifting. Here, $t=2^u$, t represents the quantity of coupling serial number types.

As illustrated with reference to FIG. 5, calculations of the first value, the second value and the third value are explained by taking $t=2$ as an example. Actually, the method for reading cache data provided in the present disclosure does not limit t to 2, and is applicable to cases that $t=2^u$, where u may be positive integers such as 1, 2, 3 and 4. Those cases of $t=2^u$ may be obtained by the ordinary skilled in the art, once understanding inventive concept of the present disclosure, by performing extensions on the embodiment as shown in FIG. 5.

For example, as shown in FIG. 6, a size of each data group in the CIC is 256 bytes, and a size of each set of cache data of each cache data type in the CIC is 8 bytes. The CIC may include two data groups, and each data group may include two cache lines. Even-type cache lines of the two data groups each store 16 sets of cache data which are marked as {instr0, instr2, instr4, . . . , instr30} and {instr32, instr34, instr36, . . . , instr62}. Odd-type cache lines of the two data groups each store 16 sets of cache data which are marked as {instr1, instr3, instr5, . . . , instr31} and {instr33, instr35, instr37, . . . , instr63}. If the CIC receives a read instruction and an original serial number of an address offset position corresponding to the read instruction is 5, according to the following formula $$\delta = n * \left\{ \left\lfloor \frac{j}{2p} \right\rfloor * 2p + (j\%2) * p + [(j\%(2p)) \gg 1] \right\},$$

a value of $\delta$ may be calculated:

$$\delta = 8 * \left\{ \left\lfloor \frac{5}{2*16} \right\rfloor * 2*16 + (5\%2)*16 + [(5\%(2*16)) \gg 1] \right\} =$$
$$8 * \{0 + 16 + 2\} = 144$$

byte. Therefore, it may be obtained that the cache data that the read instruction in fact tends to retrieve is stored in the CIC starting from 144-th byte. If the CIC receives a read instruction and an original serial number of an address offset position corresponding to the read instruction is 34, according to formula $$\delta = n * \left\{ \left\lfloor \frac{j}{2p} \right\rfloor * 2p + (j\%2) * p + [(j\%(2p)) \gg 1] \right\},$$

a value of $\delta$ may be calculated:

$$\delta = 8 * \left\{ \left\lfloor \frac{34}{2*16} \right\rfloor * 2*16 + (34\%2)*16 + [(34\%(2*16)) \gg 1] \right\} =$$
$$8 * \{32 + 0 + 1\} = 264$$

byte. Therefore, it may be obtained that the cache data that the read instruction in fact tends to retrieve is stored in the CIC starting from 264-th byte.

Alternatively, when the read instruction is used to simultaneously read cache data for two waves, and an order of reading cache data for each of the two waves is {instr0, instr1, instr2, . . . , instr63}, the processor first reads cache data from instr0 for a first wave. At this time, there may be a conflict in a process of acquiring cache data for a second wave, so the execution to acquire cache data for the second wave is paused. After the cache data from instr0 is successfully read for the first wave, the processor continues to read cache data from instr1 for the first wave. Since the odd cache lines and the even cache lines respectively use independent matching detection mechanisms, the processor may simultaneously read the cache data from instr0 for the second wave at this time. Furthermore, when the processor reads cache data from instr j for the first wave, it may simultaneously read cache data from instr j−1 for the second wave. In this way, by using one instruction cache, matching detection and reading processing of cache data for two waves can be performed simultaneously.

According to some possible embodiments, Step 206 further includes: retrieving corresponding storage data from a memory according to the read instruction in a case that there is no corresponding cache data in the data group; storing the storage data in a new data group to form new cache data.

In the case that there is no corresponding cache data in the data group, it may be regarded as a read mismatch.

For example, as shown in FIG. 4, logic components of the CIC also include MISS_FIFO, which temporarily stores mismatch results of two matching control logics. MISS_

FIFO can sequentially read storage data corresponding to mismatched read instructions from an external memory. The processing logic of the CIC further includes the following: (6) PEND_FIFO$_0$ or PEND_FIFO$_1$, in case of mismatch, wait for the storage data to be read from the external memory and update the storage data into CRAM0 or CRAM1; (7) after the storage data retrieved from the memory is returned, the storage data is updated into a replaced cache line and a corresponding request suspended in PEND_FIFO is awaken and continues to be executed; (8) after req0 and req1 read corresponding instructions, the CIC returns instruction results to the WVC so that the WVC may further process corresponding two waves.

Specifically, in a case that MATCH_E or MATCH_O in the CIC cannot obtain the corresponding cache data from Even TAG or Odd TAG, it may be confirmed that a mismatch occurs in req0 or req1. At this time, the CIC needs to lock a cache line corresponding to req0 or req1, send the cache line to MISS_FIFO, and then retrieve the storage data corresponding to the read instruction from the external memory. This process may take a long time, and the corresponding request in PEND_FIFO is suspended until the external storage data is returned.

It should be noted that, if both req0 and req1 are successfully matched, then cache data corresponding to two coupled address offset positions may be read from the CIC and returned at the same time. However, if one match succeeds and the other fails, only the successfully matched cache data may be returned; the mismatched req is suspended until the processor retrieves the storage data corresponding to the read instruction from the external memory and writes the storage data to the corresponding cache line, then the storage data may be returned to the WVC. The odd part and the even part of the CIC are independent modules, so they can operate in parallel without interfering with each other.

In the above-mentioned method for reading cache data, the CIC is utilized, the cache data is stored in an odd-even alternating manner and is mapped to odd and even cache lines within the CIC, and two sets of matching detection mechanisms are utilized to respectively perform matching detection operations and reading operations on two coupled address offset positions corresponding to one read instruction. The CIC can enable detection and reading for two coupled address offset positions simultaneously, and the CIC is hardware-friendly with relatively low hardware logic overhead. This configuration greatly improves data reading efficiency and doubles a cache data reading throughput without significantly increasing hardware logic. Furthermore, this configuration may be applied to a read-only cache, a read-write cache, and a write-only cache, which possesses great versatility.

It is to be understood that, although steps in the flow charts involved in the above-mentioned embodiments are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in in the flow charts involved in the above-mentioned embodiments may include multiple sub-steps or multiple stages, and these sub-steps or stages are not necessarily executed at the same moment, but may be executed at different moments. These steps or stages are not necessarily executed in sequence, but may be executed in turn or alternately with another step or at least a part of sub-steps or stages of another step.

Based on a same inventive concept, an apparatus for reading cache data is further provided according to an embodiment of the present disclosure, to implement the above-mentioned method for reading cache data. Implementations of the apparatus for solving problems are similar to the described implementations of the method. Therefore, specific limitations of the apparatus for reading cache data according to one or more embodiments provided below may be referred to limitations in the method for reading cache data hereinbefore, which are not repeated herein.

Figure 7:
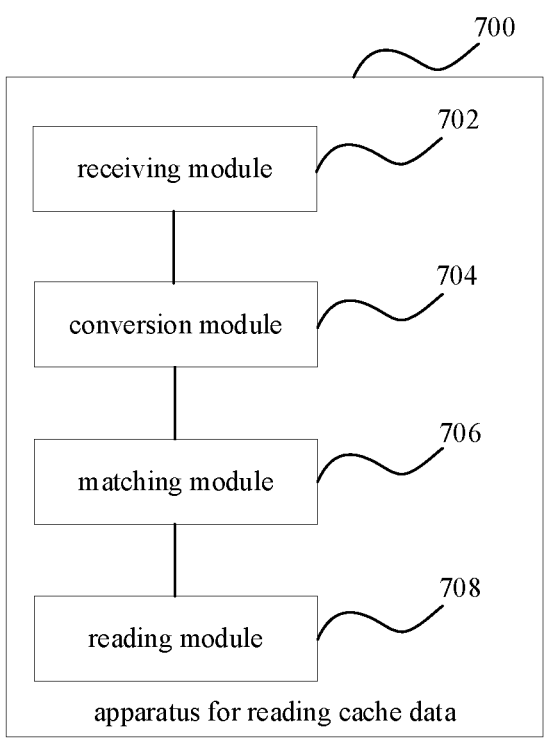
FIG. 7 is a structural block diagram of an apparatus for reading cache data according to an embodiment.

As shown in FIG. 7, an apparatus 700 for reading cache data is further provided by an embodiment of the present disclosure, which includes a receiving module 702, a conversion module 704, a matching module 706, and a reading module 708. The receiving module 702 is configured to receive a read instruction. The conversion module 704 is configured to convert at least one type of address offset position corresponding to the read instruction into a coupled address offset position according to a preset rule. The matching module 706 is configured to perform a matching operation in a data group according to the coupled address offset position which corresponds to at least one type of address offset position and obtain corresponding cache data. The reading module 708 is configured to read and display the cache data obtained through matching.

Figure 8:
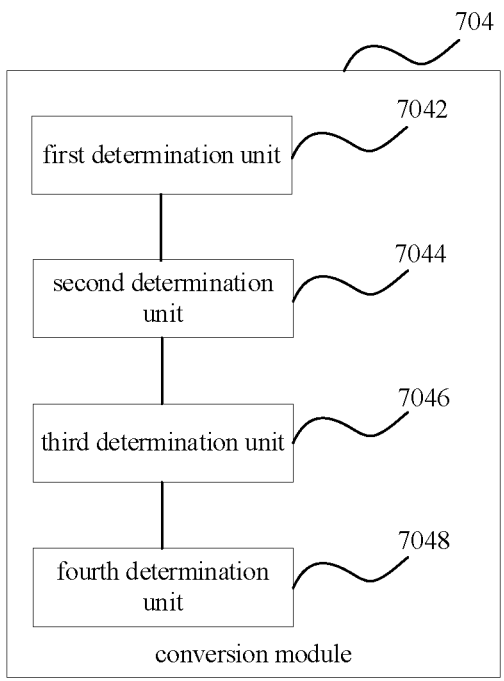
FIG. 8 is a structural block diagram of a conversion module in an apparatus for reading cache data according to an embodiment.

As shown in FIG. 8, according to some possible embodiments, each data group stores at least one cache data type, and each cache data type is composed of multiple sets of cache data, each set occupying a preset length of bytes. Each data group contains at least one coupling serial number type, and each coupling serial number type is composed of a preset quantity of coupling serial numbers. The at least one cache data type has a one-to-one correspondence with the at least one coupling serial number type, and respective sets of cache data have a one-to-one correspondence with coupling serial numbers of a corresponding coupling serial number type. The conversion module 704, configured to convert the at least one type of address offset position corresponding to the read instruction into the coupled address offset position according to the preset rule, includes a first determination unit 7042, a second determination unit 7044, a third determination unit 7046 and a fourth determination unit 7048. The first determination unit 7042 is configured to determine a first value corresponding to an address offset position based on an original serial number corresponding to the address offset position and a total amount of all coupling serial numbers in the data group. The second determination unit 7044 is configured to determine a second value corresponding to the address offset position based on the original serial number corresponding to the address offset position and the preset quantity. The third determination unit 7046 is configured to determine a third value corresponding to the address offset position based on the original serial number corresponding to the address offset position and the total amount of all coupling serial numbers in the data group. The fourth determination unit 7048 is configured to determine a coupled address offset position corresponding to the address offset position based on the first value, the second value and the third value corresponding to the address offset position and the preset length of bytes.

According to some possible embodiments, the first determination unit 7042 is further configured to divide the original serial number corresponding to the address offset position by the total amount of all coupling serial numbers in the data group, round down the result of division, and multiply an integer obtained through the rounding down operation by the total amount of coupling serial numbers of all coupling serial number types as the first value.

According to some possible embodiments, the second determination unit 7044 is further configured to: divide the original serial number corresponding to the address offset position by the quantity of coupling serial number types and take a remainder after division; and multiply the remainder by the preset quantity of coupling serial numbers to obtain the second value.

According to some possible embodiments, the third determination unit 7046 is further configured to divide the original serial number by the total amount of all coupling serial numbers in the data group and take a remainder after division, and to perform right shifting on the remainder after division according to a second preset value to obtain the third value corresponding to the address offset position.

According to some possible embodiments, the fourth determination unit 7048 is further configured to calculate the coupled address offset position via the following formula:

$$\delta = n * \left\{ \left\lfloor \frac{j}{tp} \right\rfloor * tp + (j\%t) * p + [(j\%(tp)) \gg u] \right\}$$

$\delta$ represents the coupled address offset position; n represents the preset length of bytes; j represents the original serial number; p represents the preset quantity;

$$\left\lfloor \frac{j}{tp} \right\rfloor * tp$$

represents the first value, where $$\left\lfloor \frac{j}{tp} \right\rfloor$$

represents dividing the original serial number by the total amount of all coupling serial numbers in the data group and rounding down the result of division; $(j\%t)*p$ represents the second value, where $(j\%t)$ represents dividing the original serial number corresponding to the address offset position by the quantity t of coupling serial number types and taking a remainder after division, where the value of $(j\%t)$ ranges from 0 to t−1; $[(j\%(tp))\gg u]$ represents the third value, where $j\%(tp)$ represents dividing the original serial number by the total amount of all coupling serial numbers in the data group and taking the remainder after division, and $\gg$ represents right shifting. Here, $t=2^u$.

According to some possible embodiments, the matching module 706 is further configured to retrieve corresponding storage data from a memory according to the read instruction in a case that there is no corresponding cache data in the data group; store the storage data in a new data group to form new cache data.

According to an embodiment, a computer readable storage medium is provided, and a computer program is stored therein. The following steps are implemented when the computer program is executed by a processor: receiving a read instruction; converting at least one type of address offset position corresponding to the read instruction into a coupled address offset position according to a preset rule; performing a matching operation in a data group according to the coupled address offset position which corresponds to at least one type of address offset position, and obtaining corresponding cache data; and reading the cache data obtained through matching.

According to some possible embodiments, each data group stores at least one cache data type, and each cache data type is composed of multiple sets of cache data, each set occupying a preset length of bytes. Each data group contains at least one coupling serial number type, and each coupling serial number type is composed of a preset quantity of coupling serial numbers. The at least one cache data type has a one-to-one correspondence with the at least one coupling serial number type, and respective sets of cache data have a one-to-one correspondence with coupling serial numbers of a corresponding coupling serial number type. Converting the at least one type of address offset position corresponding to the read instruction into the coupled address offset position according to the preset rule includes the following: determining a first value corresponding to an address offset position based on an original serial number corresponding to the address offset position and a total amount of all coupling serial numbers in the data group; determining a second value corresponding to the address offset position based on the original serial number corresponding to the address offset position and the preset quantity; determining a third value corresponding to the address offset position based on the original serial number corresponding to the address offset position and the total amount of all coupling serial numbers in the data group; determining a coupled address offset position corresponding to the address offset position based on the first value, the second value and the third value corresponding to the address offset position and the preset length of bytes.

According to some possible embodiments, the following steps are further implemented when the computer program is executed by the processor: dividing the original serial number corresponding to the address offset position by the total amount of all coupling serial numbers in the data group, rounding down the result of division, and taking an integer obtained through the rounding operation as the first value.

According to some possible embodiments, the following steps are further implemented when the computer program is executed by the processor: retrieving corresponding storage data from a memory according to the read instruction in a case that there is no corresponding cache data in the data group; store the storage data in a new data group to form new cache data.

According to an embodiment, a computer program product is provided, which includes a computer program. The following steps are implemented when the computer program is executed by a processor: receiving a read instruction; converting at least one type of address offset position corresponding to the read instruction into a coupled address offset position according to a preset rule; performing a matching operation in a data group according to the coupled address offset position which corresponds to at least one type of address offset position, and obtaining corresponding cache data; and reading the cache data obtained through matching.

According to some possible embodiments, each data group stores at least one cache data type, and each cache data type is composed of multiple sets of cache data, each set occupying a preset length of bytes. Each data group contains at least one coupling serial number type, and each coupling serial number type is composed of a preset quantity of coupling serial numbers. The at least one cache data type has a one-to-one correspondence with the at least one coupling serial number type, and respective sets of cache data have a one-to-one correspondence with coupling serial numbers of a corresponding coupling serial number type. Converting the at least one type of address offset position corresponding to the read instruction into the coupled address offset position according to the preset rule includes the following: determining a first value corresponding to an address offset position based on an original serial number corresponding to the address offset position and a total amount of all coupling serial numbers in the data group; determining a second value corresponding to the address offset position based on the original serial number corresponding to the address offset position and the preset quantity; determining a third value corresponding to the address offset position based on the original serial number corresponding to the address offset position and the total amount of all coupling serial numbers in the data group; determining a coupled address offset position corresponding to the address offset position based on the first value, the second value and the third value corresponding to the address offset position and the preset length of bytes.

According to some possible embodiments, the following steps are further implemented when the computer program is executed by the processor: dividing the original serial number corresponding to the address offset position by the total amount of all coupling serial numbers in the data group, rounding down the result of division, and taking an integer obtained through the rounding operation as the first value.

According to some possible embodiments, the following steps are further implemented when the computer program is executed by the processor: retrieving corresponding storage data from a memory according to the read instruction in a case that there is no corresponding cache data in the data group; store the storage data in a new data group to form new cache data.

According to an embodiment, a computer program product is provided, which includes a computer program. The following steps are implemented when the computer program is executed by a processor: receiving a read instruction; converting at least one type of address offset position corresponding to the read instruction into a coupled address offset position according to a preset rule; performing a matching operation in a data group according to the coupled address offset position which corresponds to at least one type of address offset position, and obtaining corresponding cache data; and reading the cache data obtained through matching.

According to some possible embodiments, each data group stores multiple sets of first type cache data and multiple sets of second type cache data, each set occupying a preset length of bytes. Each data group contains a preset quantity of first type coupling serial numbers and the preset quantity of second type coupling serial numbers. Multiple sets of first type cache data have a one-to-one correspondence with multiple first type coupling serial numbers, and multiple sets of second type cache data have a one-to-one correspondence with multiple second type coupling serial numbers. The following steps are further implemented when the computer program is executed by the processor: determining a first value corresponding to an address offset position based on an original serial number corresponding to the address offset position and a total amount of first type coupling serial numbers and second type coupling serial numbers in each data group; determining a second value corresponding to the address offset position based on the original serial number corresponding to the address offset position and the preset quantity; determining a third value corresponding to the address offset position based on the original serial number corresponding to the address offset position; and determining a coupled address offset position corresponding to the address offset position based on the first value, the second value and the third value corresponding to the address offset position and the preset length of bytes.

Those with ordinary skill in the art may understand that all or some of the steps of the method according to the above-mentioned embodiments may be implemented by a computer program instructing relevant hardware. The computer program may be stored in a nonvolatile computer readable storage medium. When the computer program is executed, processes of the above-mentioned methods may be implemented. Any references to a memory, a database, or another medium used in the various embodiments provided in the disclosure may include at least one of a non-volatile and a volatile memory. The nonvolatile Memory may include Read-Only Memory (ROM), magnetic tape, floppy disk, flash memory, optical memory, high-density embedded non-volatile memory, Resistive Random Access Memory (Re-RAM), Magnetic Random Access Memory (MRAM), Ferroelectric Random Access Memory (FRAM), Phase Change Memory (PCM), graphene memory, and the like. Volatile memory may include Random Access Memory (RAM), external high-speed buffer, and the like. By way of illustration and not limitation, RAM may take many forms, such as Static Random Access Memory (SRAM) or Dynamic Random Access Memory (DRAM), among others. The databases referred in various embodiments provided herein may include at least one of relational and non-relational databases. The non-relational database may include, but is not limited to, a block chain based distributed database, and the like. The processors referred in the embodiments provided herein may be, but are not limited to, general purpose processors, central processing units, graphics processors, digital signal processors, programmable logic devices, quantum computing based data processing logic devices, and the like.

Technical features of the above-mentioned embodiments may be freely combined. To be brief in description, not all possible combinations of the technical features in the above-mentioned embodiments are described. However, the combinations of these technical features should be considered to fall within the scope of this specification as long as these combinations cause no conflicts.

The above-mentioned embodiments only represent several embodiments of this disclosure, and their descriptions are specific and detailed, but should not be understood as limiting the scope of the present application. It should be noted that, several modifications and improvements can be made by those of ordinary skill in the art without departing from the concept of this disclosure, which belong to the protection scope of the present application. Therefore, it is intended that the protection scope of the present application shall be subjected to the appended claims.

What is claimed is:

1. A method for reading cache data, comprising:

receiving, by a Coupled Instruction Cache (CIC) of a graphics processing unit (GPU), a read instruction configured to simultaneously read cache data for at least two waves in the GPU, the read instruction carrying at least two types of address offset positions corresponding to the at least two waves;

converting by the CIC, according to a preset rule, the at least two types of address offset positions corresponding to the read instruction into coupled address offset positions in the CIC;

performing, by matching control logics of the CIC, matching operations in data groups of the CIC in response to at least two requests according to the coupled address offset positions which correspond to at least two types of address offset positions, to obtain corresponding cache data for the at least two waves; and reading, by the CIC, the cache data for the at least two waves obtained through the matching operations from corresponding cache lines of CRAMs of the CIC;

wherein each data group of the CIC stores at least two cache data types which correspond to the at least two waves, and each cache data type is composed of a plurality of sets of cache data, each set occupying a preset length of bytes; each data group comprises at least two coupling serial number types, and each coupling serial number type is composed of a preset quantity of coupling serial numbers types; the at least two cache data types have a one-to-one correspondence with the at least two coupling serial number types, and respective sets of cache data have a one-to-one correspondence with coupling serial numbers of a corresponding coupling serial number type;

wherein the converting, according to the preset rule, the at least two types of address offset positions corresponding to the at least two waves into the coupled address offset positions in the CIC comprises:

determining a first value corresponding to an address offset position based on an original serial number corresponding to the address offset position and a total amount of all coupling serial numbers in the data group;

determining a second value corresponding to the address offset position based on the original serial number corresponding to the address offset position and a quantity of coupling serial number types;

determining a third value corresponding to the address offset position based on the original serial number corresponding to the address offset position and the total amount of all coupling serial numbers in the data group; and determining a coupled address offset position corresponding to the address offset position based on the first value, the second value and the third value corresponding to the address offset position and the preset length of bytes.

2. The method of claim 1, wherein the determining the first value corresponding to the address offset position based on the original serial number corresponding to the address offset position and the total amount of all coupling serial numbers in the data group comprises:

dividing the original serial number corresponding to the address offset position by the total amount of all coupling serial numbers in the data group and rounding down a result of division; and multiplying an integer obtained through the rounding down operation by the total amount of coupling serial numbers of all coupling serial number types as the first value.

3. The method of claim 1, wherein the determining the second value corresponding to the address offset position based on the original serial number corresponding to the address offset position and the quantity of coupling serial number types comprises:

dividing the original serial number corresponding to the address offset position by the quantity of coupling serial number types and taking a remainder after division; and multiplying the remainder by the preset quantity of coupling serial numbers to obtain the second value.

4. The method of claim 1, wherein the determining the third value corresponding to the address offset position based on the original serial number corresponding to the address offset position and the total amount of all coupling serial numbers in the data group comprises:

dividing the original serial number by the total amount of all coupling serial numbers in the data group and taking a remainder after division; and performing right shifting on the remainder after division according to a second preset value to obtain the third value corresponding to the address offset position.

5. The method of claim 1, wherein the determining the coupled address offset position corresponding to the address offset position based on the first value, the second value and the third value corresponding to the address offset position and the preset length of bytes comprises:

calculating the coupled address offset position via a following formula:

$$\delta = n * \left\{ \left\lfloor \frac{j}{tp} \right\rfloor * tp + (j\%t) * p + [(j\%(tp)) \gg u] \right\};$$

where $\delta$ represents the coupled address offset position; n represents the preset length of bytes; j represents the original serial number; p represents the preset quantity; t represents the quantity of coupling serial number types;

$$\left\lfloor \frac{j}{tp} \right\rfloor * tp$$

represents the first value, where $$\left\lfloor \frac{j}{tp} \right\rfloor$$

represents dividing the original serial number by the total amount of all coupling serial numbers in the data group and rounding down a result of division; (j%t)*p represents the second value, where (j%t) represents dividing the original serial number corresponding to the address offset position by the quantity of coupling serial number types and taking a remainder after division, the value of (j%t) ranging from 0 to t−1; [(j%(tp))>>u] represents the third value, where j%(tp) represents dividing the original serial number by the total amount of all coupling serial numbers in the data group and taking a remainder after division, and >> represents right shifting; wherein t=2$^u$.

6. The method of claim 1, wherein the performing the matching operation in the data group according to the coupled address offset positions which correspond to the at least two types of offset positions, to obtain the corresponding cache data further comprises:

retrieving corresponding storage data from a memory according to the read instruction in a case that there is no corresponding cache data in the data group;

storing the storage data in a new data group to form new cache data.

7. An apparatus for reading cache data, comprising a graphics processing unit (GPU) and a computer readable non-transitory storage medium which stores a computer program thereon, wherein the GPU comprises a Coupled Instruction Cache (CIC);

wherein the computer is configured to initiate a read instruction to the GPU, wherein the (CIC) of the GPU is configured to simultaneously read cache data for at least two waves in the GPU, the read instruction carrying at least two types of address offset positions corresponding to the at least two waves;

wherein the CIC is further configured to convert the at least two types of address offset positions corresponding to the read instruction into coupled address offset positions according to a preset rule;

the CIC comprises matching control logic configured to perform matching operations in data groups of the CIC according to the coupled address offset positions which correspond to the at least two types of address offset positions and obtaining corresponding cache data for the at least two waves; and wherein the CIC is further configured to read the cache data for the at least two waves obtained through the matching control logic from corresponding cache lines of CRAMs of the CIC;

wherein each data group of the CIC stores at least two cache data types which correspond to the at least two waves, and each cache data type is composed of a plurality of sets of cache data, each set occupying a preset length of bytes; each data group comprises at least two coupling serial number types, and each coupling serial number type is composed of a preset quantity of coupling serial numbers; the at least two cache data types have a one-to-one correspondence with the at least two coupling serial number types, and respective sets of cache data have a one-to-one correspondence with coupling serial numbers of a corresponding coupling serial number type;

wherein the CIC is configured to convert, according to the preset rule, the at least two types of address offset positions corresponding to the read instruction into the coupled address offset positions by:

determining a first value corresponding to an address offset position based on an original serial number corresponding to the address offset position and a total amount of all coupling serial numbers in the data group;

determining a second value corresponding to the address offset position based on the original serial number corresponding to the address offset position and a quantity of coupling serial number types;

determining a third value corresponding to the address offset position based on the original serial number corresponding to the address offset position and the total amount of all coupling serial numbers in the data group; and determining a coupled address offset position corresponding to the address offset position based on the first value, the second value and the third value corresponding to the address offset position and the preset length of bytes.

8. The apparatus of claim 7, wherein the determining the first value corresponding to the address offset position based on the original serial number corresponding to the address offset position and the total amount of all coupling serial numbers in the data group comprises:

dividing the original serial number corresponding to the address offset position by the total amount of all coupling serial numbers in the data group and rounding down a result of division; and multiplying an integer obtained through the rounding down operation by the total amount of coupling serial numbers of all coupling serial number types as the first value.

9. The apparatus of claim 7, wherein the determining the second value corresponding to the address offset position based on the original serial number corresponding to the address offset position and the quantity of coupling serial number types comprises:

dividing the original serial number corresponding to the address offset position by the quantity of coupling serial number types and taking a remainder after division; and multiplying the remainder by the preset quantity of coupling serial numbers to obtain the second value.

10. The apparatus of claim 7, wherein the determining the third value corresponding to the address offset position based on the original serial number corresponding to the address offset position and the total amount of all coupling serial numbers in the data group comprises:

dividing the original serial number by the total amount of all coupling serial numbers in the data group and taking a remainder after division; and performing right shifting on the remainder after division according to a second preset value to obtain the third value corresponding to the address offset position.

11. The apparatus of claim 7, wherein the determining the coupled address offset position corresponding to the address offset position based on the first value, the second value and the third value corresponding to the address offset position and the preset length of bytes comprises:

calculating the coupled address offset position via a following formula:

$$\delta = n * \left\{ \left\lfloor \frac{j}{tp} \right\rfloor * tp + (j\%t) * p + [(j\%(tp)) \gg u] \right\};$$

where $\delta$ represents the coupled address offset position; n represents the preset length of bytes; j represents the original serial number; p represents the preset quantity; t represents the quantity of coupling serial number types;

$$\left\lfloor \frac{j}{tp} \right\rfloor * tp$$

represents the first value, where $$\left\lfloor \frac{j}{tp} \right\rfloor$$

represents dividing the original serial number by the total amount of all coupling serial numbers in the data group and rounding down a result of division; (j%t)*p represents the second value, where (j%t) represents dividing the original serial number corresponding to the address offset position by the quantity of coupling serial number types and taking a remainder after division, the value of (j%t) ranging from 0 to t−1; [(j%(tp))>>u] represents the third value, where j%(tp) represents dividing the original serial number by the total amount of all coupling serial numbers in the data group and taking a remainder after division, and >> represents right shifting; wherein t=2$^u$.

12. A computer readable non-transitory storage medium, which stores a computer program thereon, wherein the computer program, when executed by a graphics processing unit (GPU) initiates a read instruction wherein a Coupled Instruction Cache (CIC) of the GPU is configured to simultaneously read cache data for at least two waves in the GPU, the read instruction carrying at least two types of address offset positions corresponding to the at least two waves;

wherein the CIC is further configured to convert, according to a preset rule, the at least two types of offset positions corresponding to the read instruction into coupled address offset positions;

wherein the CIC comprises matching control logic configured to perform matching operations in data groups of the CIC according to the coupled address offset positions which correspond to the at least two types of address offset positions, to obtain corresponding cache data; and wherein the CIC is further configured to read the cache data obtained through matching;

wherein each data group of the CIC stores at least two cache data types, which correspond to the at least two waves, and each cache data type is composed of a plurality of sets of cache data, each set occupying a preset length of bytes; each data group comprises at least two coupling serial number types, and each coupling serial number type is composed of a preset quantity of coupling serial numbers; the at least two cache data types have a one-to-one correspondence with the at least two coupling serial number types, and respective sets of cache data have a one-to-one correspondence with coupling serial numbers of a corresponding coupling serial number type;

wherein the CIC is configured to convert, according to the preset rule, the at least two types of address offset positions corresponding to the read instruction into the coupled address offset positions by:

determining a first value corresponding to an address offset position based on an original serial number corresponding to the address offset position and a total amount of all coupling serial numbers in the data group;

determining a second value corresponding to the address offset position based on the original serial number corresponding to the address offset position and a quantity of coupling serial number types;

determining a third value corresponding to the address offset position based on the original serial number corresponding to the address offset position and the total amount of all coupling serial numbers in the data group; and determining a coupled address offset position corresponding to the address offset position based on the first value, the second value and the third value corresponding to the address offset position and the preset length of bytes.

13. The computer readable non-transitory storage medium of claim 12, wherein the determining the first value corresponding to the address offset position based on the original serial number corresponding to the address offset position and the total amount of all coupling serial numbers in the data group comprises:

dividing the original serial number corresponding to the address offset position by the total amount of all coupling serial numbers in the data group and rounding down a result of division; and multiplying an integer obtained through the rounding down operation by the total amount of coupling serial numbers of all coupling serial number types as the first value.

14. The computer readable non-transitory storage medium of claim 12, wherein the determining the second value corresponding to the address offset position based on the original serial number corresponding to the address offset position and the quantity of coupling serial number types comprises:

dividing the original serial number corresponding to the address offset position by the quantity of coupling serial number types and taking a remainder after division; and multiplying the remainder by the preset quantity of coupling serial numbers to obtain the second value.

15. The computer readable non-transitory storage medium of claim 12, wherein the determining the third value corresponding to the address offset position based on the original serial number corresponding to the address offset position and the total amount of all coupling serial numbers in the data group comprises:

dividing the original serial number by the total amount of all coupling serial numbers in the data group and taking a remainder after division; and performing right shifting on the remainder after division according to a second preset value to obtain the third value corresponding to the address offset position.

16. The computer readable non-transitory storage medium of claim 12, wherein the determining the coupled address offset position corresponding to the address offset position based on the first value, the second value and the third value corresponding to the address offset position and the preset length of bytes comprises:

calculating the coupled address offset position via a following formula:

$$\delta = n * \left\{ \left\lfloor \frac{j}{tp} \right\rfloor * tp + (j\%t) * p + [(j\%(tp)) \gg u] \right\};$$

where δ represents the coupled address offset position; n represents the preset length of bytes; j represents the original serial number; p represents the preset quantity; t represents the quantity of coupling serial number types;

$$\left\lfloor \frac{j}{tp} \right\rfloor * tp$$

represents the first value, where $$\left\lfloor \frac{j}{tp} \right\rfloor$$

represents dividing the original serial number by the total amount of all coupling serial numbers in the data group and rounding down a result of division; (j%t)*p represents the second value, where (j%t) represents dividing the original serial number corresponding to the address offset position by the quantity of coupling serial number types and taking a remainder after division, the value of (j%t) ranging from 0 to t−1; [(j%(tp))>>u] represents the third value, where j%(tp) represents dividing the original serial number by the total amount of all coupling serial numbers in the data group and taking a remainder after division, and >> represents right shifting; wherein t=2ᵘ.

\* \* \* \* \*